US005186311A

United States Patent [19]

Fryc et al.

[11] Patent Number: 5,186,311

[45] Date of Patent: Feb. 16, 1993

[54] HOLD-DOWN DEVICE FOR ARTICLES ON A CONVEYOR

[75] Inventors: Oldrich Fryc, Renton; Ronald M. Olive, Seattle, both of Wash.

[73] Assignee: The Boeing Company, Seattle, Wash.

[21] Appl. No.: 811,514

[22] Filed: Dec. 20, 1991

Related U.S. Application Data

[62] Division of Ser. No. 559,470, Jul. 30, 1990, Pat. No. 5,099,542.

[51] Int. Cl.[5] .............................................. B65G 15/14

[52] U.S. Cl. .............................. 198/626.6; 198/626.1; 198/836.2; 198/604

[58] Field of Search ............... 198/626.1, 626.4, 626.6, 198/604, 688.1, 836.1, 836.2, 837

[56] References Cited

U.S. PATENT DOCUMENTS 3,132,737 5/1964 Moon et al. .................... 198/604 X
3,179,234 4/1965 Bloom et al. ................... 198/604 X
3,258,110 6/1966 Pilcher ............................ 198/626.4
3,391,658 7/1968 Williams ...................... 198/836.2 X
3,516,539 6/1970 Gulstrom et al. ........... 198/836.2 X
3,915,291 10/1975 Vogts .............................. 198/626.1
3,951,257 4/1976 Storace et al. .................. 198/626.6
5,042,372 8/1991 Bielfeldt et al. ............. 198/626.6 X

FOREIGN PATENT DOCUMENTS 1189440 10/1959 France ............................. 198/626.1
1594680 7/1970 France ............................. 198/626.1

*Primary Examiner*—Robert P. Olszewski
*Assistant Examiner*—James R. Bidwell
*Attorney, Agent, or Firm*—J. Michael Neary; B. A. Donahue

[57] ABSTRACT

An apparatus for holding honeycomb core parts down on a conveyor while dust is being cleaned from the cells of the honeycomb by an upper air knife blowing a narrow jet of air down through the honeycomb cells as the part is being carried on a conveyor belt through an exhaust hood, and a pair of upwardly aimed air knives below the conveyor belt blowing two narrow jets of air on both sides of the first air knife through the honeycomb cells. The part is held down on the conveyor belt against the lifting force of the two air jets from the two lower air knives by a floating hold-down mechanism, which is adjustably counterbalanced to control the amount of hold-down force it exerts on the honeycomb part. The upper air knife is mounted on a counterbalance system that enables it to ride above and blow down through the hold-down mechanism without exerting significant force on the honeycomb part. The dust removed from the part is entrained in an air stream drawn through the exhaust hood and is removed from the air stream in a cyclone separator.

3 Claims, 5 Drawing Sheets

HOLD-DOWN DEVICE FOR ARTICLES ON A CONVEYOR

This is a Division of U.S. patent application Ser. No. 07/559,470 filed on Jul. 30, 1990 and Entitled "Honeycomb Core Dust Removal System," now U.S. Pat. No. 5,099,542.

BACKGROUND OF THE INVENTION

This invention relates to a method and apparatus for removing dust form the cell cores of pieces of honeycomb core material in preparation for bonding the core between of material to form a honeycomb sandwich structure.

Honeycomb core is widely used in the preparation of panels and other parts fabricated of composite material for lightness and strength. The honeycomb core itself is a construction of mat or sheet material, such as aluminum, fiberglass, Kevlar, graphite or Nomex, which is glued or otherwise bonded on offset bond lines on every other sheet and then expanded to form a block of hexagonal cell material. The expanded block of honeycomb core material, if made of fiberous mat, can be impregnated with phenolic resin or the like and cured to form a stiff and light weight core structure for the honeycomb sandwich composite panel or part.

A typical honeycomb core composite panel or part is made by cutting a honeycomb core block across the cell columns, usually by a band saw, to make a flat slab on the order of 1–4 inches thick. If required for the shape of the part, the slab is shaped by milling and/or sanding to provide the correct cross sectional shape of the part. A composite sheet or skin is bonded to both sides of the honeycomb core to make the front and back faces of the part, and the edges are finished to complete the part.

The sawing, milling, and sanding operations on the honeycomb core part produce large quantities of dust which tend to collect in the hexagonal cell columns in the honeycomb core. Most of this dust falls out when the part is tapped against the work table, but a substantial portion remains adhering to the interior walls of the hexagonal cell columns by static electricity and simple adhesion to the interior cell walls.

In order to reduce the weight of the part, but primarily to insure good bonding of the front and back sheets to the core, the core must be thoroughly cleaned of dust which is generated in the shaping operations. In the past, the dust was vacuumed from the cell columns where the shaping operation occurred but a sizable quantity of dust remained on the interior cell walls. To remove this remaining dust, it has been necessary in the past to blow air through the core cell columns with a hand held air hose or draw air through the cell columns with a hand held vacuum hose, but the time and expense of hand operations of this nature are expensive and the completeness of dust removal was always somewhat haphazard. Moreover, the manual processes tend to spread the dust into the general shop atmosphere causing discomfort and general dissatisfaction among the shop personnel with the shop conditions, as well as substantially increasing the clean up requirement. Also, equipment operated in a dusty environment tends to collect the dust in the moving parts of the equipment and shortens their working life. Finally, it is believed that a clean shop environment tends to encourage clean working practices among the workers and demonstrate the employer's commitment to provide a clean and safe environment for the workers. For these and other reasons, it is highly desirable to provide a contained system for removing as much as is reasonably possible of the dust generated in the cutting and shaping operations on the honeycomb core parts, so as to keep the shop atmosphere as free as possible from free floating dust.

SUMMARY OF THE INVENTION

Accordingly, it is an object of this invention to provide a machine for automatically removing a large percentage of the dust, created in the sawing and shaping operations for making a honeycomb core part, in a manner that will capture the dust and Prevent its contamination of the atmosphere in the shop. It is another object of the invention to Provide a machine which can self-adjust to honeycomb core parts of different thickness and still be effective in removing a sufficient quantity of dust from the honeycomb core part such that good bonding of the front and back panels to the honeycomb core can be effected. Still another object of the invention is to provide a honeycomb core cleaning device which gently handles the thinnest and most fragile honeycomb core parts, and also adjusts to accept large and rugged parts, and in which the dust removal is accomplished by air flow through the cell columns, the air flow being adjustable in rate according to the thickness and cell size of the honeycomb core part. Still a further object of the invention is to provide a process for cleaning dust from a honeycomb core part without damaging the part and without contaminating the shop atmosphere with dust.

These and other objects of the invention are attained in an apparatus having a support structure for supporting a perforated or foraminous conveyor belt and an upper hold-down web between which the honeycomb core Parts are sandwiched and conveyed through an exhaust hood mounted over and around the conveyor belt. The conveyor belt carries the parts through the exhaust hood and between a series of air knives which blow narrow streams of air up through and down through the honeycomb core cell columns to blow the dust which is trapped in or adhering to the cell columns out of the honeycomb core and into the exhaust hood. A vacuum duct in the exhaust hood exhausts the air flow out of the hood to a dust separator where the dust is separated from the air flow before the air is exhausted to the atmosphere.

DESCRIPTION OF THE DRAWINGS

The invention, and it's many attendant objects and advantages, will become more apparent upon reading the following detailed description of the preferred embodiment in conjunction with the following drawings, wherein.

DESCRIPTION OF THE PREFERRED EMBODIMENT

Figure 1:
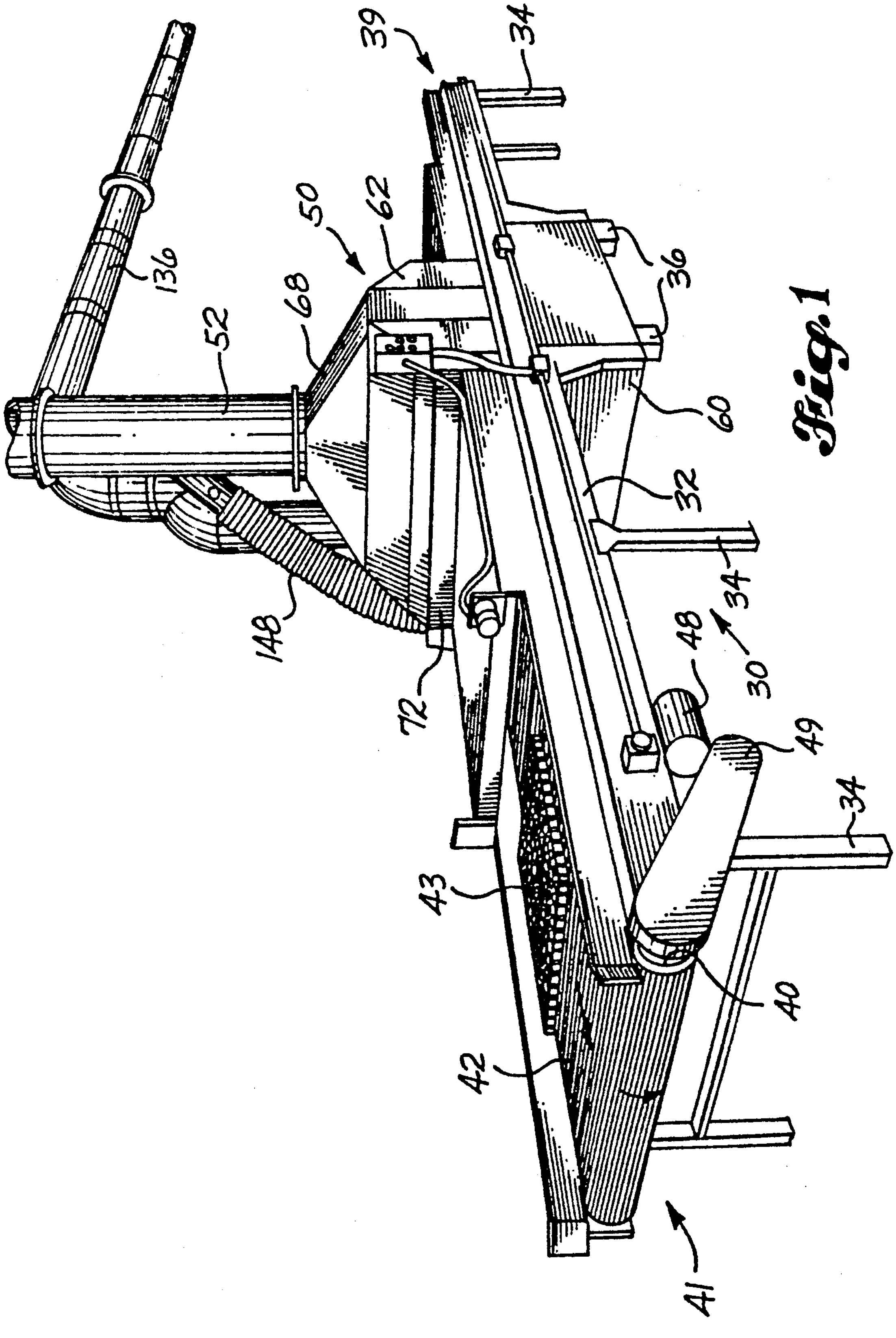
FIG. 1 is a perspective view of an apparatus according to the invention for removing dust from honeycomb core pieces.

Turning now to the drawings, wherein like reference characters designate identical or corresponding parts, and more particularly to FIG. 1 thereof, an apparatus according to the invention for removing dust from the cell columns of honeycomb core parts is shown having a support structure 30 including a frame 32 supported at the ends of the frame by legs 34 and supported at the central portion of the frame by stub legs 36. The frame 32 supports a roller 38 at the input end 39 of the apparatus and a drive roller 40 at the output end 41. A foraminous or mesh conveyor belt 42 is trained around the rollers 38 and 40 to carry honeycomb core articles or parts 43 from the input end 39, through the central portion of the apparatus, then out the output end 41 where they may be removed. The foraminous conveyor belt 42 has an upper course 44 which runs straight across the top of the rollers 38 and 40 supported in the frame 32, and a bottom course 46 which runs from the rear or exit end roller 40 back toward the front or input end roller 38 A drive motor 48 operating through a conventional chain and sprocket drive behind a chain guard 49, drives the drive roller 40 to drive the belt 42.

Figure 2:
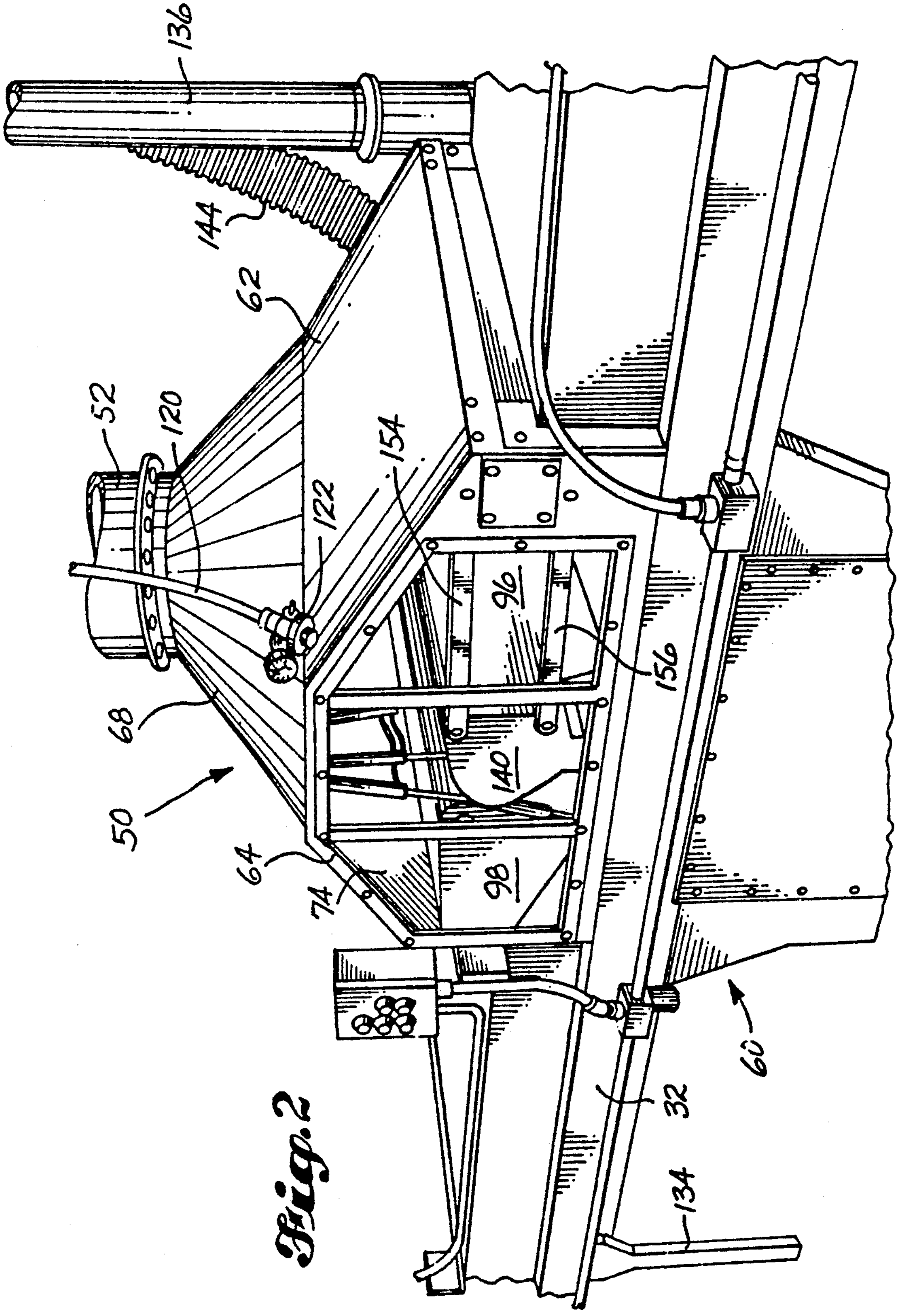
FIG. 2 is a perspective view of the central portion of the machine shown in FIG. 1.

At the central position of the apparatus, as shown in FIG. 2, the upper course 44 of the belt 42 runs through an exhaust hood 50 where air is blown through nozzles to dislodge the dust in the cell columns of the honeycomb core part 43 and to entrain the dust in the air streams from the nozzles. The dust is then carried in an air flow out through an exhaust duct 52 at the top of the exhaust hood 50, and is drawn through a dust separator 56 by a high pressure exhaust fan 54, shown schematically in FIG. 3.

Figure 5:
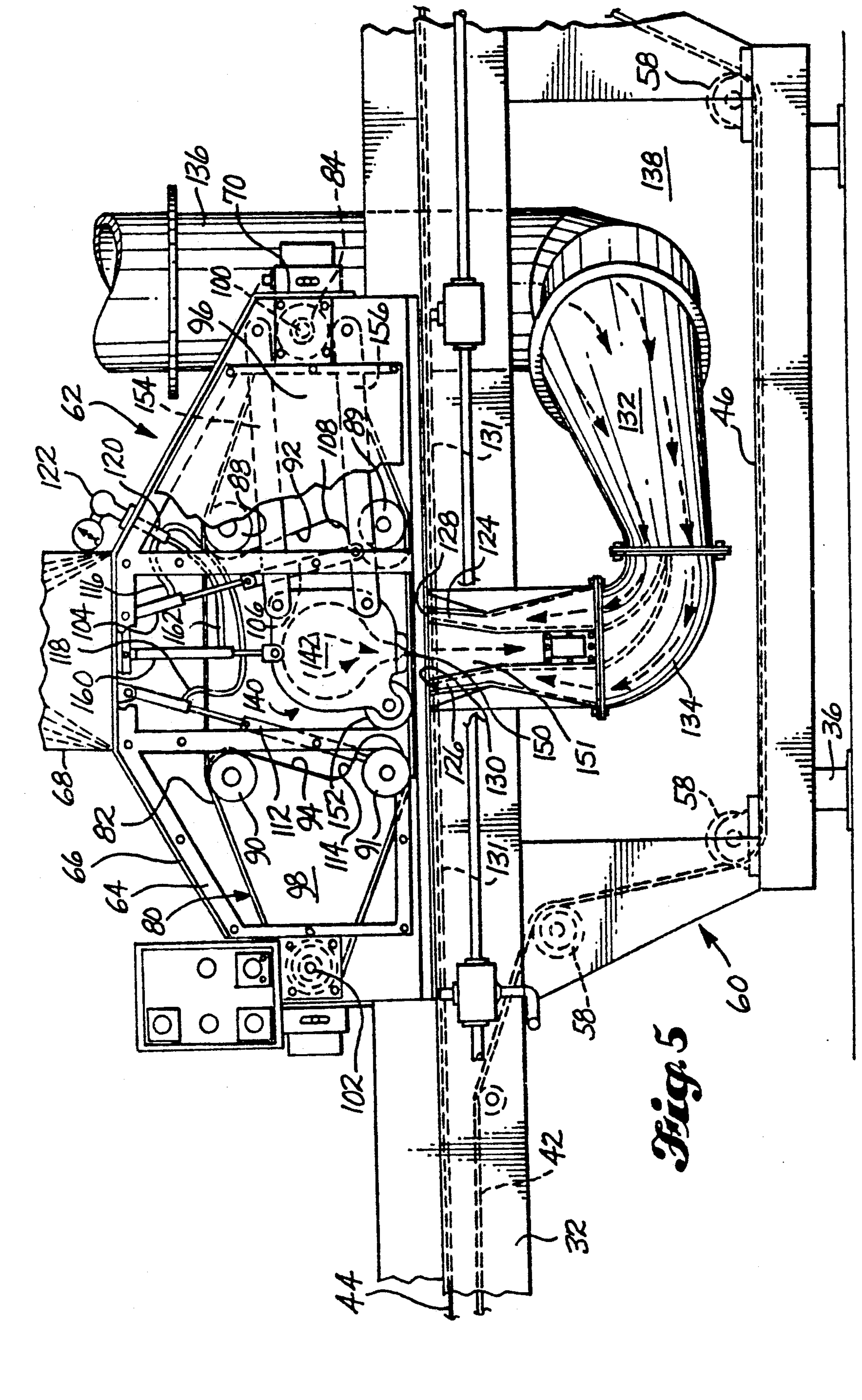
FIG. 5 is a side elevation of the central portion of the machine shown in FIG. 2, showing the exhaust hood and some of the parts contained therein.

As shown in FIG. 5, the lower course 46 of the conveyor belt 42 is trained around a series of six rollers 58 in a lower sound muffling enclosure 60 beneath the exhaust hood 50 to provide space between the upper course 44 and the bottom course 46 of the conveyor belt 42 for the nozzles to blow streams of air upward through the upper course 44 of the conveyor belt 42 and through the cell columns of the honeycomb core Part 43 on the conveyor belt 42. The exhaust hood 50 has an upper portion 62 including a frame 64 to which an upper panel 66 is attached. The upper panel 66 extends from a converging or funnel shaped adaptor 68 at the top of the upper portion 62 of the exhaust hood 50 and extends in a sloping direction toward the front and rear ends of the upper portion 62 of the exhaust hood. The front of the exhaust hood has a front panel 70 which extends downwardly to a position approximately four inches above the conveyor belt 42, defining an entrance opening into the exhaust hood upper portion 62. The rear end of the exhaust hood has a rear panel 72 which extends downwardly from the upper panel 66 to a position approximately four inches above the conveyor belt 42 defining therebetween a exit opening for clean parts to be carried out of the exhaust hood 50. The exhaust hood upper portion 62 has a plexiglass side panel 74 which enables the operator to see the internal operation of the apparatus and facilitate the diagnosis and corrective action in case a malfunction occurs.

A hold down mechanism 80 is provided to hold the honeycomb core Parts 43 down on the conveyor belt 42 as they are being carried through the exhaust hood 50, to insure that the cleaning air streams do not move the light weight honeycomb core parts 43 around on the conveyor belt 42 which could cause them to become jammed in the equipment. The hold down mechanism 80 includes a formation web 82 trained around a front roller 84, a rear roller 86 and four middle rollers 88, 89, 90 and 91. The middle rollers 88–91 are mounted on the inside ends 92 and 94 of a pair of front and rear triangular frames 96 and 98. The roller 84 is mounted at a front apex of the front triangular frame 96, and the rear roller 86 is mounted at the rear apex 102 of the rear triangular frame 98, and is driven by a motor 103. The front and rear triangular frames are pivotally supported in the frame 64 at the apex 100 and 102 respectively so that the frames 96 and 98 can pivot about the pivotal attachment at the front and rear apexes 100 and 102.

The inside end 92 of the front triangular frame 96 is supported by a pair of air cylinders 104 (only the near side one of which is shown in FIG. 5) which are attached at their top ends to the frame 64 and attached at their bottom ends to a link 106 which in turn is attached to a shoulder 108 formed by a cut away in the rear inside end of the frame 96. Likewise, the rear triangular frame 98 is supported at its inside end 94 by a pair of air cylinders 110 (only the near side one of which is shown in FIG. 5.) The air cylinder 110 is attached at its upper end to the frame 64, and at its lower end to a link 112, in turn attached to a shoulder 114 formed by a cutaway in the inside end 94 of the rear triangular frame 98.

The air cylinders 104 and 110 are pressurized through air hoses 116 and 118 respectively from an air pressure supply line 120 provided for that purpose. The pressure supplied to the air cylinders 104 and 110 is controlled by an air pressure supply regulator 122 which can be manually adjusted to control the lifting force exerted by the air cylinders 104 and 110. In this way, it is possible to control the hold down force exerted by the web 82 so that just enough hold down force is exerted to hold the parts 43 on the conveyor belt 42, but the force exerted by the hold down mechanism 80 is light enough to avoid damaging the Parts 43 going through the exhaust hood 50.

Figure 6:
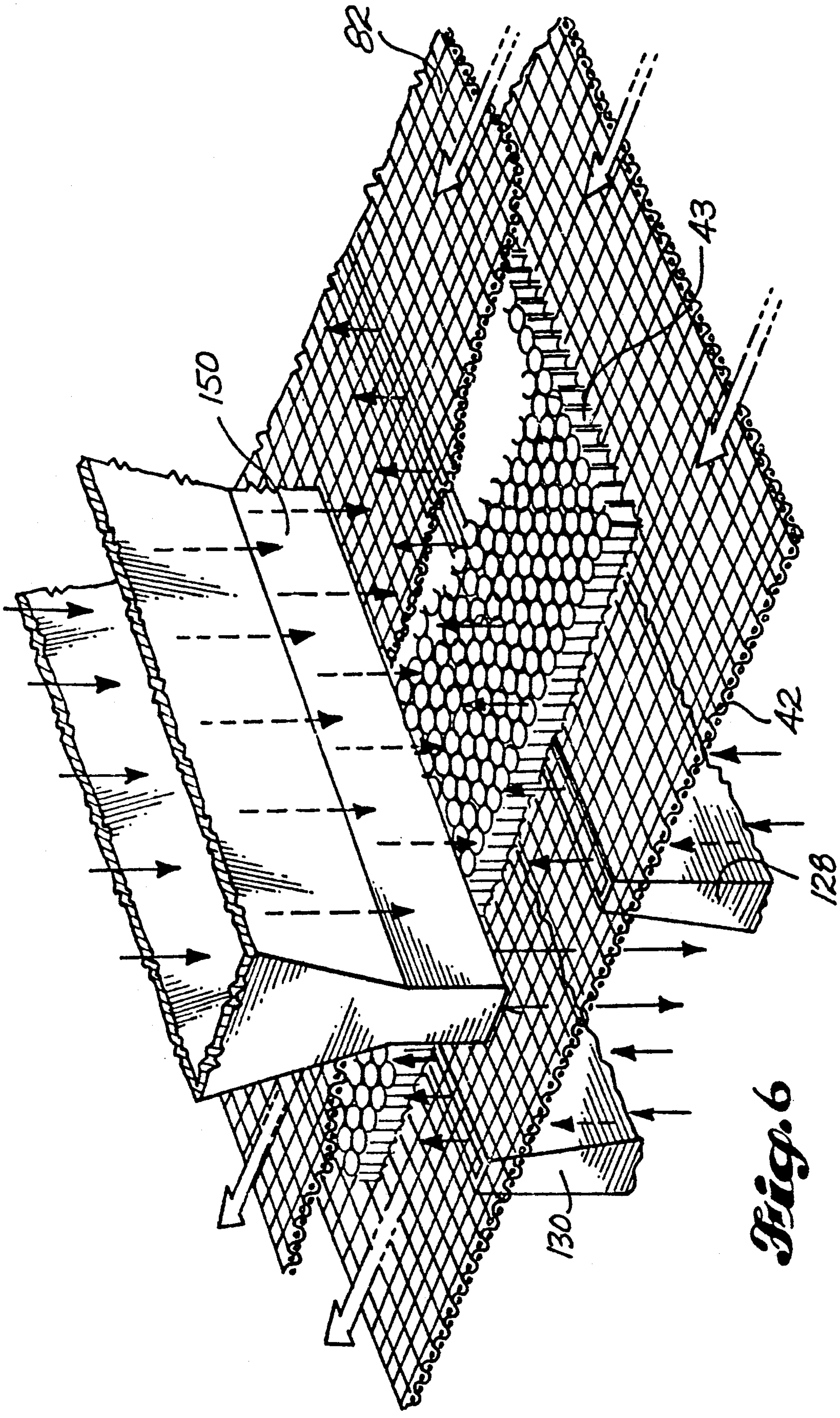
FIG. 6 is an enlarged Perspective of the nozzles of the upper and lower air knives blowing air through the honeycomb core part being cleaned by the invention.

The enclosure 60 beneath the exhaust hood 50 contains a pair of longitudinally spaced air knives 124 and 126. The air knives extend completely across the width of the conveyor belt 42 and converge to two narrow nozzles 128 and 130, each one approximately $\frac{1}{8}$ inch wide, shown in FIGS. 5 and 6, to produce two narrow streams of air upward through the belt 42 and through the honeycomb core Part 43 to blow the dust from the cell columns upward out into the upper portion 62 of the exhaust hood 50. A panel 131 connected across the top of the enclosure and having a central opening connected to the front of the nozzle 128 and the rear of the nozzle 130 separates the exhaust hood 50 from the enclosure 60 to prevent dust from settling into the enclosure 60 and concentrate the flow of air to where it is most effective in removing dust.

Figure 3:
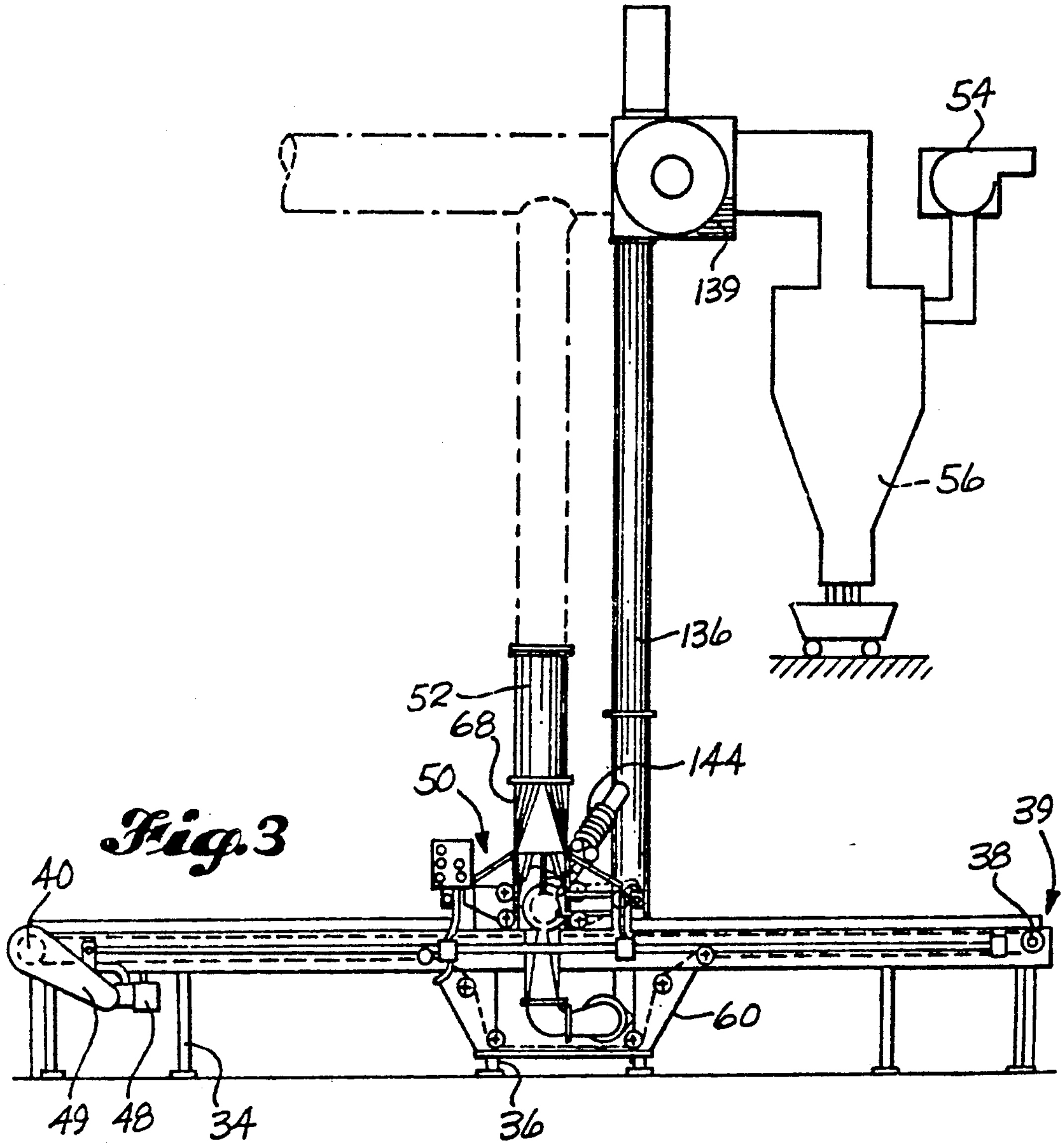
FIG. 3 is a side elevation of the apparatus shown in FIG. 1.
Figure 4:
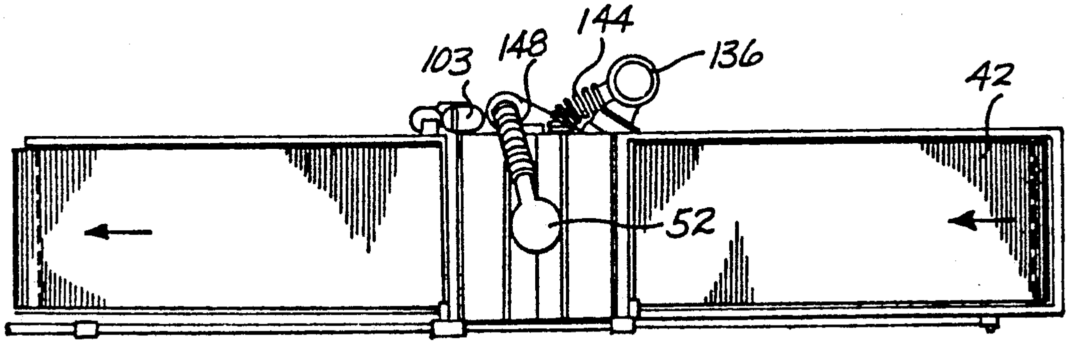
FIG. 4 is a plan view of the apparatus shown in FIG. 3.

The air for the two air knives 124 and 126 is supplied from a conduit 132 which bifurcates at an adaptor 134. The air to the conduit 132 is supplied from a main air supply line 136 which is connected to a high pressure fan 139. The main air supply line 136 and the high pressure fan 139 shown in FIG. 3 are in front of, but not connected to, the exhaust duct 52. The conduit 132 extends from the side of the apparatus through a panel on the far side of the enclosure 60.

The upper portion 62 of the exhaust hood 50 houses an upper air knife 140. A plenum 142 in the upper air knife 140 is connected by a flexible conduit 144 to the main air supply line 136. The flexible conduit 144 extends through the back of the upper exhaust hood 60, through a plate held over an opening in the back of the hood 60 by guides which permit the conduit to ride up and down with the upper air knife 140 as it rides over the honeycomb core parts 43 running through the machine. An elongated narrow nozzle 150 at the bottom of the air knife 140 blows air downward through the foraminous web 82 and through the honeycomb core part 43 on the foraminous conveyor belt 42. The width of the nozzle 150, like the nozzles 128 and 130, is about ⅛ inch. The air from the nozzle 150, together with the dust from the cell columns entrained in the air stream from the nozzle 150, is blown into an air plenum 151 between the two lower air knives 124 and 126. The air plenum 151 is evacuated through a flexible conduit 148 connected to the exhaust duct 52.

To accommodate various thicknesses of honeycomb core part Passing through the apparatus, the upper air knife is suspended and guided to ride up over the part 43 as it passes through the machine, but to keep the nozzle 150 in close proximity to the top surface of the lower course of the foraminous web 82. The guiding and suspension means includes a roller 152 rotatably attached to the upper air knife 140 to allow the upper air knife to roll along the top surface of the lower course of the foraminous web 82 and thereby maintain the close position of the nozzle 150 to the foraminous web 82. A set of links 154 and 156 connected in Parallelogram fashion between the frame 64 of the upper portion 62 of the exhaust hood 50, and the upper air knife insures that the nozzle 150 will remain pointed straight down though the foraminous web as the upper air knife rides up and down over the honeycomb core parts 43 passing though the machine.

The weight of the upper air knife 140 and its associated equipment is counterbalanced by an air cylinder 160 supplied through an air hose 162 from the air pressure supply line 120 to carry the greatest proportion of the weight of the upper air knife and its associated Parts. In this way, it is possible to insure that the weight bearing on the foraminous web 82 is just sufficient to hold the honeycomb core part 43 down on the conveyor belt 42 against the two streams of air flowing upward through the nozzles 128 and 130 of the front and rear air knives 124 and 126.

In operation, the drive motor 48 is energized to drive the conveyor belt through the drive chain behind the guard 49, and the drive motor 103 is energized to drive the foraminous web 82 through the roller 86. Air pressure is applied to the lower air knives 124 and 126 through the main air supply line 136 to start the air streams blowing through the nozzles 128 and 130, and air pressure is applied through the flexible conduit 144 to the air knife 140 to start the air stream blowing through the nozzle 150. The vacuum to the exhaust duct 52 is turned on to begin evacuating the hood 50 and the air plenum 142 under the upper air knife 140. Air pressure is applied to the air pressure supply line 120 to pressurize the air cylinders 110 and 160 and thereby partially carry the weight of the hold-down mechanism 80 and the upper air knife 140. The apparatus is now ready to receive a honeycomb core part.

A honeycomb core part 43 is placed on the conveyor belt 42 at the input end 39, and the belt carries the part into the input end of the hood 50. As the part reaches the region of the roller 89 where the web 82 approaches the conveyor belt 42, the part passes into the nip between the web 82 and the conveyor belt 42. As the Part enters the nip, the front frame 96 lifts over the part and the web and partial weight of the front frame 96 holds the part down on the conveyor belt 42 to prevent the part from being lifted by the stream of air blowing from the nozzle 128 of the air knife 124 up through the belt 42 and the part 43.

The upper air knife 140, counterbalanced by the air cylinder 160 and supported on the roller 152 rolling on the upper surface of the lower course of the web between the rollers 89 and 91, is lifted by the rising web as the part approaches the center of the apparatus. The parallelogram connection of the links 154 and 156 maintains the direction of the nozzle 150 of the upper air knife 140 straight down through the web 82 and the cell columns of the part to blow the dust remaining in the cell columns into the plenum 151 where it is evacuated through the flexible conduit 148 into the exhaust duct 52.

The Part continues through the apparatus, sandwiched between the belt 42 and the foraminous web 82, and passes over the nozzle 130 of the air knife 126. The upward stream of air from the nozzle 130 blows the remaining dust, which was loosened by the previous two streams of air directed in opposite directions, out of the cell columns of the honeycomb part and into the upper hood 62 where the dust is evacuated with the air in which it is entrained, through the exhaust duct 52.

The part continues through the apparatus between the belt 42 and the web 82 to ensure that stray gusts or air currents do not blow the light part around on the belt where it could become caught in the machinery and damaged. The part then exits from between the belt 42 and web 82 and is carried out of the exhaust hood 50 by the belt 42. The Part, now cleaned of dust in the cell columns, can be lifted from the exit end 41 of the belt 42.

The honeycomb core cleaning apparatus and method disclosed herein is thus capable of cleaning the dust accumulated in the cell columns of honeycomb core parts in a simple, reliable and automatic process in one pass through the machine in a way that contains and captures all of the dust extracted from the part and safely carries the dust out of the shop. The machine is extremely gentle to the fragile honeycomb core part and yet thoroughly cleans it of dust in the cell columns.

Obviously, numerous modifications and variations of the preferred embodiment disclosed herein are possible and would occur to one skilled in the art in view of this disclosure.

Accordingly, it is expressly to be understood that these modifications and variations, and the equivalents thereof, may be practiced while remaining within the spirit and scope of the invention as defined in the following claims, wherein we claim:

1. A hold-down mechanism for holding a part down on a moving conveyor belt, comprising:

two triangular frames, each having an inside end facing the inside end of the other frame, and an outside end at an apex of each triangular frame;

each of said frames being pivotally supported at said end apex thereof on a support structure;

each of said frame includes a top and bottom corner on said inside end;

an idler roller rotatably mounted on said top and bottom corners of both of said frames;

an end roller mounted on said apex of both of said frames;

a foraminous web trained around said two end rollers and said four idler rollers;

drive means for driving one of said end rollers to drive said web around said six rollers;

means for synchronizing the speed of said web around said six rollers with the speed of said conveyor belt; and suspension means for controlling the hold-down force exerted by said web on said part on said conveyor belt.

2. The hold-down mechanism defined in claim 1, wherein:

said suspension means includes at least two air cylinders, one each air cylinder attached at one end to said support structure, and the other end of each air cylinder attached respectively to said inner end of a respective one of said frames.

3. The hold-down mechanism defined in claim 1, further comprising:

means for connecting a source of air Pressure to each of said air cylinders; and means for regulating the air pressure delivered to said air cylinders from said source of air pressure.

* * * * *

UNITED STATES PATENT AND TRADEMARK OFFICE

CERTIFICATE OF CORRECTION

PATENT NO. : 5,186,311
DATED : February 16, 1993
INVENTOR(S) : Frye, et al

It is certified that error appears in the above-indentified patent and that said Letters Patent is hereby corrected as shown below:

Column 1, Line 12, "removing dust form"
should read —removing dust from—

Column 1, Line 14, "Between of material"
should read —Between sheets of material—

Column 3, Line 26 "38"
should read —38.—

Column 4, Line 6, "includes a formation"
should read —includes a foraminous—

Signed and Sealed this

Eighteenth Day of October, 1994

Attest:

BRUCE LEHMAN

*Attesting Officer*

*Commissioner of Patents and Trademarks*